April 15, 1947.    O. A. KEHLE    2,419,143

RELIEF VALVE

Filed May 28, 1943

Inventor
Ottmar A. Kehle:
By R. S. Bunt
Attorney

Patented Apr. 15, 1947

2,419,143

UNITED STATES PATENT OFFICE 2,419,143

RELIEF VALVE

Ottmar A. Kehle, West Los Angeles, Calif., assignor to Adel Precision Products Corp., a corporation of California Application May 28, 1943, Serial No. 488,924

1 Claim. (Cl. 137—53)

This invention relates to improvements in hydraulic relief valves of the type shown in my pending application for United States Letters Patent Ser. No. 463,281, filed October 24, 1942. Valves of this type are used to protect aircraft hydraulic systems against damage or improper operation due to excessive pressures, said valves being constructed and arranged to by-pass fluids from the pressure side to the return side of the system when a predetermined pressure is reached in the pressure side.

In relief valves of this type it is important to provide for accurate adjustment thereof to permit of the desired relief action at different pressures best suited to the particular system and equally important to prevent chattering and attendant noise and operational uncertainties which heretofore have attended the use of such valves. Usually the tension of the spring against which the valve is opened, is regulated by an adjusting means applied directly to the end of the spring farthest removed from the valve.

I have found that by providing, in a relief valve of the character described, especially constructed valve and seat members with provisions for adjusting the seat member to regulate the tension of the spring to set the valve to open at different pressures, a greater nicety of adjustment is obtained, fluttering action and attendant noise and wear of the valve are eliminated, and a full and effective relief flow is assured at any critical predetermined pressure over a greater range of pressures than heretofore under the extremely high pressures now used in hydraulic systems, wherefore it is the primary object of this invention to achieve the advantages, actions and results aforesaid.

Another object of my invention is to provide a relief valve of the character described which by reason of the novel construction and arrangement of the valve, its seat and the adjusting provisions of the latter, the valve body member may be made comparatively small and of less bulk and weight with a minimum amount of machining operations, whereby the unit as a whole is made more reliable as to operation and better adapted to use in aircraft hydraulic systems operating under pressures above 1500 pounds per square inch.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
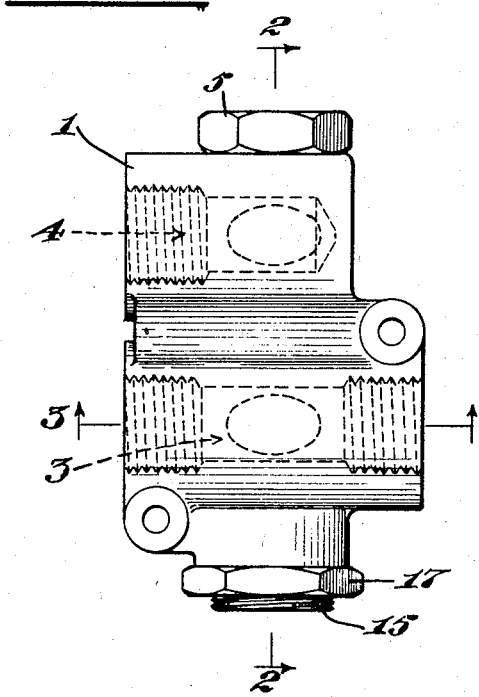
Fig. 1 is a side elevation of a valve embodying my invention.
Figure 2:
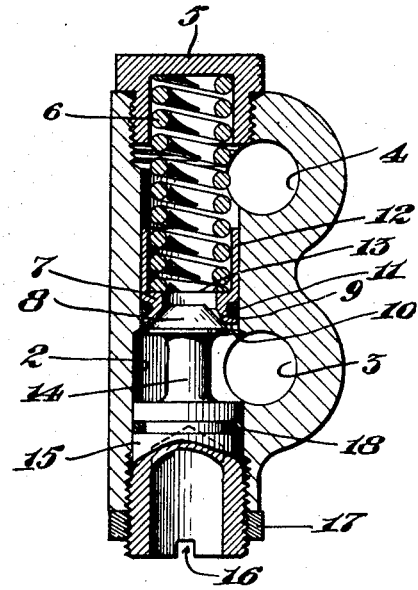
Fig. 2 is a vertical sectional view taken on the line 2—2 of Fig. 1.

Referring to the drawings more specifically, it is seen that one embodiment of my invention includes a substantially rectangular valve body 1 having a valve-receiving bore 2 extending longitudinally therethrough and provided adjacent one end with a pressure fluid port 3 extending transversely through the body and intersecting the bore 2. Adjacent the other end of the bore 2 is a return port 4 parallel to the port 3 and extending from the bore 2 to an outer surface of the body 1. It should be noted that the ports 3 and 4 are off-set so that only peripheral portions thereof intersect corresponding portions of the valve-receiving bore 2 thereby providing elongated or substantially oval communicating openings between the bore 2 and said ports as shown in dotted lines in Fig. 2.

A screw cap 5 is turned in the end of the bore 2 which is adjacent the return port 4 and is engaged by one end of a spring 6 which urges an annular valve member 7 against a circular seat 8 of frusto-conical form disposed between the ports 3 and 4. This annular valve member has a conical seating face 9 on the inner periphery thereof, only the lower margin of which contacts the seat. It is also provided with a flat annular end surface 10 exposed in an annular space provided between the wall of the bore 2 and the outer periphery of the valve seat member. This flat annular end surface is exposed to the fluid pressure just above the plane of the base of the frusto-conical seat 8 so that the valve will be unseated responsive to a predetermined pressure in excess of the force of the spring 6.

A sealing ring 11 of circular cross section is mounted on the outer periphery of the valve member 7 so as to have sealing engagement with the wall of the bore 2. A cylindrical guide and spring seat member 12 is formed integral with the valve member 7 and has a working fit in the bore 2, said member and valve providing a shoulder 13 as a seat for the spring 6.

In accordance with this invention the valve seat 8 is axially adjustable in the bore 2 to regulate the tension of the spring so that at predetermined fluid pressures the valve member 7 will be unseated. Accordingly the seat 8 consists of an inwardly tapering frusto-conical head formed on the inner end of a stem 14 of considerably less diameter than the bore 2 projecting from the inner end of a cylindrical plug-like externally screw threaded member 15 which is turned in the bore 2 and therefore axially adjustable therein. Owing to the stem being much smaller in diameter than the head 8 the fluid admitted to one side of the circular valve seat by the port 3 is very quickly delivered to the portion of said seat located at the opposite side of said stem. The outer end of the body member 15 is extended beyond the valve body 1 and provided with a slot 16 for reception of a suitable tool for adjusting the valve seat as aforesaid. A lock nut 17 holds the valve body 15 in adjusted position. A sealing 18 of circular cross section is provided adjacent the inner end of the body member 15 to engage the wall of the bore and form an effective seal at that point. Owing to the aforesaid parts 8, 14 and 15 being all in one symmetrical piece, the entire surface of which is concentric to its axis, cost of manufacture is reduced and a valve seat structure results that will withstand hard usage for a long period of time.

It is now seen that by reason of the particular construction of the valve and its seat and the provisions for adjusting the seat to regulate the tension of the spring, a greater nicety of adjustment is afforded than where an adjusting means is provided against the end of the spring farthest removed from the valve. Moreover, the construction of the valve assures a positive seating and unseating action free from fluttering and attendant objections and wear. Furthermore the construction of the valve body member is greatly simplified by reason of the particular valve and seat construction here employed. A minimum of machining is required and the size, bulk and weight of the unit are materially reduced.

It should be noted that the valve seat 8 has a comparatively large diameter defining but a small annular space between it and the wall of the bore 2, in which space a likewise relatively small area of the valve member 7 is exposed to the pressure of the fluid passing through the port 3. This is desirable since this valve unit is used in high pressure systems where the pressure of the fluid in the port 3 reaches from 1500 to 3000 pounds per square inch and the valve 7 should remain closed during these high pressures and should open only when pressures in excess of these high limits are reached. Moreover this makes it possible to use an annular valve member having a small width of the "land" thereof even though a large internal diameter of the annulus is provided and such a valve member is more reliable in its operation for a "high pressure" relief valve as here provided. In this connection it is noted that the internal diameter of the annular valve 7 is more than half the diameter of the bore 2. Moreover, the use of a narrow width annulus or "land" for the valve and a large diameter valve seat member closing the bore 2 except for the aforesaid small annular space makes it possible to use but a moderately heavy spring even though the valve is held seated against such high pressures as hereinbefore noted.

Figure 4:
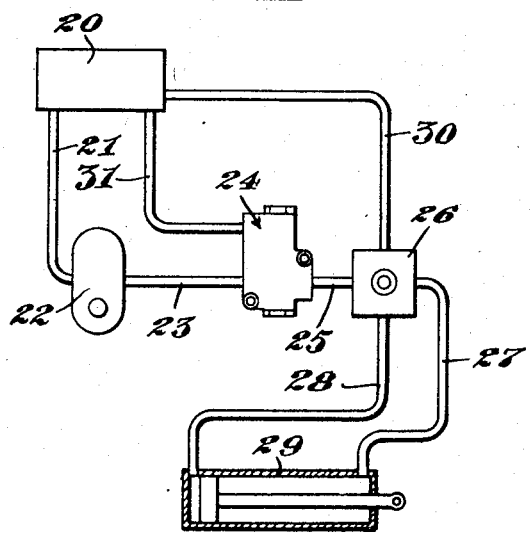
Fig. 4 is a diagrammatic view of a hydraulic system including the relief valve embodying the present invention.
Figure 3:
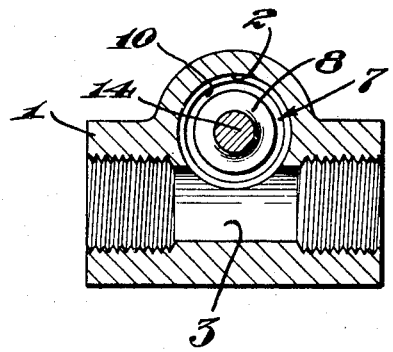
Fig. 3 is a cross sectional view taken on the line 3—3 of Fig. 1.

Fig. 4 shows diagrammatically a hydraulic system embodying the valve of my invention wherein said system embodies a reservoir 20 connected by a line 21 to a pump 22 which in turn is connected by a line 23 to the valve of my invention, generally designated 24. This connection of line 23 is made at one end of the transverse port 3 and from the other end of this port a line 25 extends to a 4-way control valve of conventional type here designated 26. Lines 27 and 28 lead from the control valve to opposite ends of a cylinder 29 whereby the usual control of said cylinder may be effected. A return line 30 leads from the valve 26 back to the reservoir 20. Completing the circuit is the return line 31 which leads from the outer end of the port 4 of my valve 24 to the reservoir 20. It is now seen that should the pressure in the line 23 or 25 exceed the force of spring 6 of my valve 24, the valve member 7 thereof will be unseated and allow by-passing of the pressure fluid through the bore 2, port 4 and line 31 back to the reservoir thereby relieving the system of excessive pressure.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a hydraulic relief valve, a body having a valve-receiving bore extended therethrough, a pressure port extending tangentially to and communicating with one side of said bore, a return port extending tangentially from said bore through an outer surface of said body, a removable closure at one end of said bore, an annular valve member having a working fit in said bore between said ports, a spring interposed between said valve member and said closure for urging the valve member against its seat, a frusto-conical valve seat in said bore between said ports having a maximum diameter greater than half the diameter of the bore and being circumferentially spaced from the wall of the bore to define an annular space exposing an annular portion of the valve member to the pressure of fluid in said pressure port, a plug member axially adjustable in and closing the other end of said bore, and a stem opposite said pressure port of materially less diameter than the maximum diameter of said seat and fixed to said plug member and said seat so that the seat is axially adjusted with the plug member to regulate the tension of said spring and a widened annular fluid inlet space is provided around said stem, said seat, stem and plug member constituting a one piece construction and said plug member extending outwardly from the valve body for manipulation to axially adjust the valve seat.

OTTMAR A. KEHLE.

REFERENCES CITED

The following references are of record in the file of this patent:

UNITED STATES PATENTS

| Number | Name | Date |
|---|---|---|
| 2,280,937 | Thornhill | Apr. 28, 1942 |
| 1,011,314 | Canner | Dec. 12, 1911 |
| 1,767,841 | Fisher | June 24, 1930 |
| 2,249,206 | Hubbard | July 15, 1941 |
| 1,637,085 | Nichols | July 26, 1927 |
| 1,045,307 | McCluskey | Nov. 26, 1912 |
| 675,854 | Emery | June 4, 1901 |
| 1,649,866 | Steiner | Nov. 22, 1927 |
| 1,970,131 | Douglas | Aug. 14, 1934 |
| 1,800,185 | Thrush | Apr. 7, 1931 |

FOREIGN PATENTS

| Number | Country | Date |
|---|---|---|
| 527,919 | Britain | Oct. 18, 1940 |